Feb. 9, 1932.                S. F. GULBA                1,844,758
                             TRACTION DEVICE
                       Filed Aug. 26, 1931        2 Sheets-Sheet 1
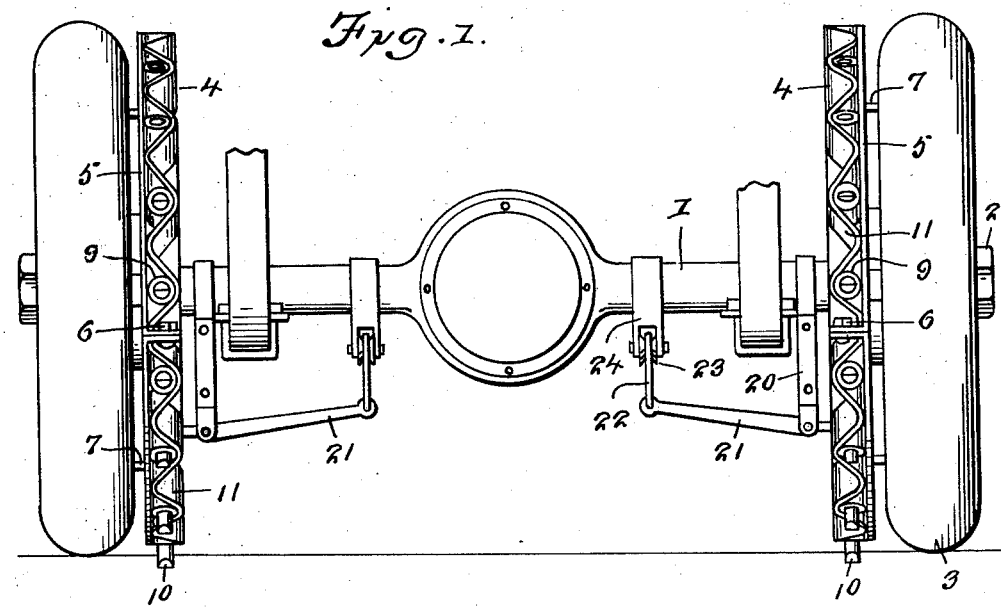
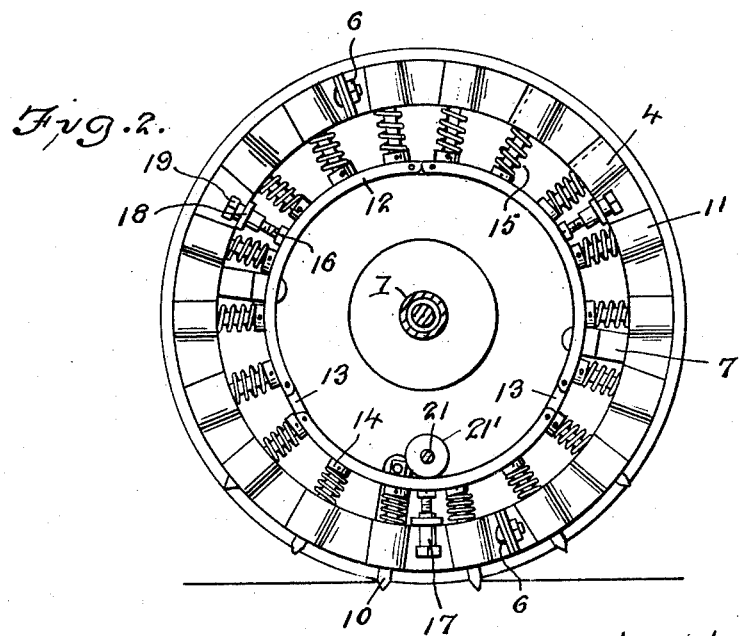
S. F. Gulba
INVENTOR
BY Victor J. Evans
and Co. ATTORNEY Feb. 9, 1932.   S. F. GULBA   1,844,758
TRACTION DEVICE
Filed Aug. 26, 1931   2 Sheets-Sheet 2
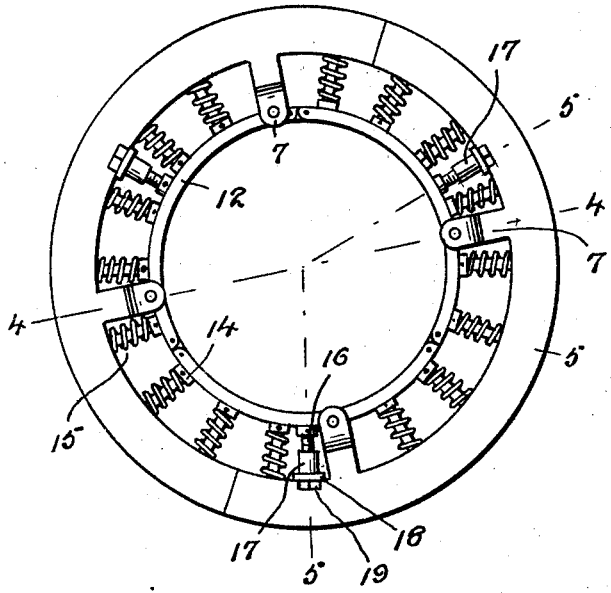
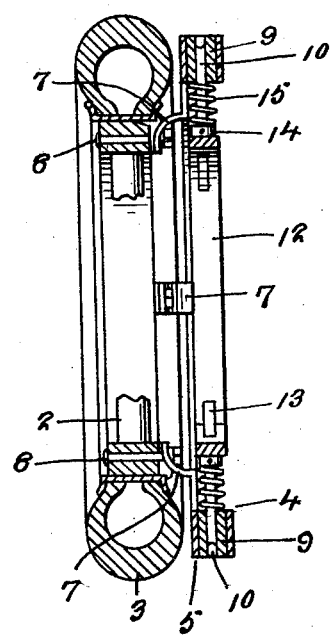
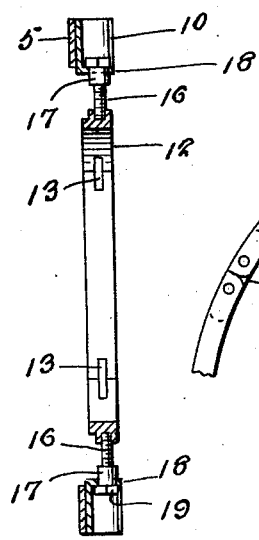
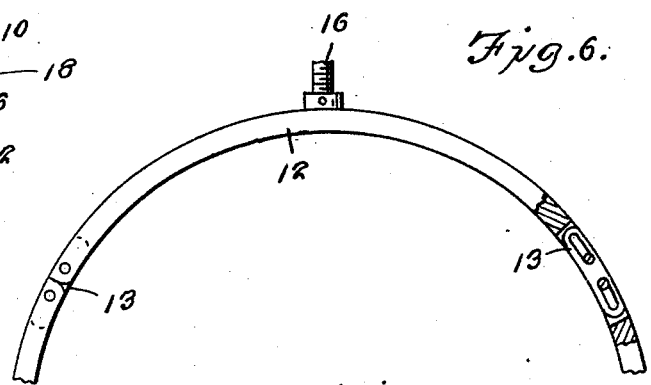
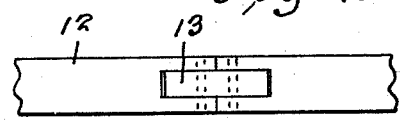
S. F. Gulba INVENTOR
BY Victor J. Evans and Co. ATTORNEY Patented Feb. 9, 1932

1,844,758

UNITED STATES PATENT OFFICE

STANLEY F. GULBA, OF SHAMOKIN, PENNSYLVANIA

TRACTION DEVICE

Application filed August 26, 1931. Serial No. 559,526.

This invention relates to traction devices for motor vehicles and has for the primary object, the provision of a device for each wheel of the motor vehicle, the device being so arranged that they may be adjusted to engage the ground for the purpose of permitting the vehicle to obtain sufficient traction and to prevent skidding, thereby materially reducing motor vehicle accidents when travelling over slippery or ice covered roads and obviating the employment of the ordinary anti-skid chains.

Another object of this invention is the provision of a traction device of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a rear elevation of a motor vehicle chassis with my invention applied thereto.

Figure 2 is a side elevation of the traction device.

Figure 3 is a similar view illustrating the device arranged in an inactive position.

Figure 4 is a sectional view taken on the line 4—4 of Figure 2 showing the device associated with a wheel and its tire.

Figure 5 is a sectional view taken on the line 5—5 of Figure 3.

Figure 6 is a fragmentary sectional view illustrating the adjusting member.

Figure 7 is a fragmentary plan view illustrating the connection between the sections of the adjusting member.

Referring in detail to the drawings, the numeral 1 indicates the rear axle housing of a motor vehicle having the usual rear wheels 2 associated therewith and equipped with tires 3. A traction device 4 is applied to each of the wheels and includes a rim 5 comprising a pair of sections detachably secured by fasteners 6 whereby the rim may be easily placed about the axle housing 1 and located adjacent the inner face of the wheel. The rim 4 has formed thereon a plurality of brackets 7 apertured to receive the rim securing bolts 8 of the wheel, so that the rim 4 is supported in close proximity to the inner face of the wheel as shown in Figure 4 with the periphery thereof disposed inwardly of the tread of the tire, so that the device normally is spaced a slight distance from the ground. The rim 4 has formed integral therewith relatively spaced bearings or cylinders 9 to slidably receive ground engaging elements 10. The cylinders or bearings are strengthened or reinforced by a serpentine web 11 forming an integral part of the rim 4 and is also welded or otherwise secured to the cylinders or bearings.

An adjusting member 12 is arranged inwardly of the rim and includes a plurality of arcuately shaped sections slidably connected by links 13 to permit the sections to move relative to each other for the purpose of expanding and contracting the adjusting member. A plurality of seats 14 are formed on the outer periphery of the adjusting member 12 in which are secured the inner ends of the ground engaging elements 10 while the outer ends of said elements are sharpened or pointed to facilitate said elements biting into the ground when brought into engagement therewith. Expansion springs 15 are mounted upon the ground engaging elements between the rim 4 and the adjusting member 12 for normally urging the ground engaging elements inwardly of the rim 4.

Screw threaded rods 16 are secured to the sections of the adjusting member 12 and are threaded into sleeves 17 having slidable engagement with a flange 18 formed on the rim 4. The sleeves 17 are provided with heads 19 for limiting the movements of the sleeves relative to the flange 18 in one direction. By adjusting the sleeves on the threaded rods 16, the adjusting member 12 may be moved inwardly or outwardly. When the adjusting member 12 is moved outwardly, the ground engaging elements 10 project outwardly of the cylinders or bearings 9 and slightly beyond the periphery of the tire so as to bite into the ground and obtain sufficient traction for the wheel when passing over slippery roads or roads covered with ice.

The adjusting member 12 may be operated through a hand lever (not shown) and when so operated, the sleeves 17 are adjusted on the rods 16 to permit the adjusting member 12 to have a full movement or adjustment relative to the rim 4. Brackets 20 are secured to the axle housing 1 and have pivoted thereto levers 21 carrying at their outer ends rollers 21' engaging in the inner peripheries of the adjusting members 12 while the inner ends of the levers are connected to flexible elements 22 trained over rollers 23 of brackets 24 mounted on the axle housing 1 and the cables are connected to the hand lever so that on actuation of the latter the levers may be rocked on their pivots to cause the rollers to force the adjusting members 12 outwardly relative to the rims 4 causing certain of the ground engaging elements to extend from their respective cylinders or bearings and beyond the wheel for engagement with the ground.

If desired, other forms of means may be provided for securing the rims to the wheels than that shown in Figure 4 and also it is to be noted that this device may be used in emergencies for a wheel to engage the ground should the tire become deflated. When the tire is deflated, the rim 4 assumes the load of the respective wheel to the ground permitting the vehicle to proceed without the danger of mutilating the tire.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A traction device comprising a rim secured to a wheel, bearings carried by said rim, ground engaging elements slidably mounted in the bearings, a sectional adjusting element supporting the inner ends of the ground engaging elements, means slidably connecting the sections of the adjusting element, expansion springs mounted on the ground engaging elements between the bearings and the adjusting element, and an adjusting means between the adjusting element and the rim.

2. A traction device comprising a rim, ground engaging elements slidably mounted on the rim, a sectional adjusting element supporting the inner ends of the ground engaging elements, screw threaded rods carried by said adjusting element, expansion springs between the rim and adjusting element and mounted on the ground engaging elements, internally screw threaded sleeves slidably connected to the rim and threaded to the rods, and means for limiting the movement of the sleeves in one direction.

In testimony whereof I affix my signature.
STANLEY F. GULBA.